(12) United States Patent
Pfeifle

(10) Patent No.: US 10,169,370 B2
(45) Date of Patent: Jan. 1, 2019

(54) NAVIGATION DATABASE CUSTOMIZATION

(71) Applicant: HERE Global B.V., Eindhoven (NL)

(72) Inventor: Martin Pfeifle, Seewald (DE)

(73) Assignee: HERE Global B.V., Eindhoven (NL)

( * ) Notice: Subject to any disclaimer, the term of this patent is extended or adjusted under 35 U.S.C. 154(b) by 28 days.

(21) Appl. No.: 13/918,104

(22) Filed: Jun. 14, 2013

(65) Prior Publication Data

US 2014/0372487 A1    Dec. 18, 2014

(51) Int. Cl.
*G06F 17/30* (2006.01)
*G01C 21/00* (2006.01)

(52) U.S. Cl.
CPC ....... *G06F 17/30241* (2013.01); *G01C 21/00* (2013.01)

(58) Field of Classification Search
CPC ... G06F 17/30241; G01C 21/00; G01C 21/32; G01C 21/3484
See application file for complete search history.

(56) References Cited

U.S. PATENT DOCUMENTS

| | | | | |
|---|---|---|---|---|
| 6,173,277 B1* | 1/2001 | Ashby et al. | ............. | 340/995.18 |
| 6,707,421 B1* | 3/2004 | Drury et al. | ............. | 342/357.31 |
| 6,778,524 B1* | 8/2004 | Augart | ............. | H04L 29/06 |
| | | | | 370/248 |
| 7,921,136 B1* | 4/2011 | Shuman | ............. | G01C 21/26 |
| | | | | 707/802 |
| 8,117,041 B1* | 2/2012 | Khan | ............. | G01C 21/32 |
| | | | | 705/1.1 |
| 2003/0041070 A1* | 2/2003 | Thompson et al. | ...... | 707/103 R |
| 2004/0103117 A1* | 5/2004 | Segler | ............. | G06F 17/30241 |
| 2004/0139049 A1* | 7/2004 | Hancock | ............. | G01C 21/20 |
| 2007/0118278 A1* | 5/2007 | Finn | ............. | G06F 17/30241 |
| | | | | 701/438 |
| 2007/0135992 A1* | 6/2007 | Riise et al. | ............. | 701/207 |
| 2009/0024656 A1* | 1/2009 | Wellman | ............. | 707/103 R |
| 2009/0043785 A1* | 2/2009 | Garward | ............. | G06F 17/30312 |
| 2009/0063646 A1* | 3/2009 | Mitnick | ............. | G06F 17/30241 |
| | | | | 709/206 |
| 2009/0100031 A1* | 4/2009 | Gilligan et al. | ............. | 707/4 |

(Continued)

FOREIGN PATENT DOCUMENTS

| | | |
|---|---|---|
| EP | 2354984 A1 | 8/2011 |
| EP | 2354985 A1 | 8/2011 |

(Continued)

OTHER PUBLICATIONS

David Wilson et al., "Personalizing Map Content to Improve Task Completion Efficiency", International Journal of Geographical Information Science, May 2010, pp. 741-760, vol. 24, No. 5.

(Continued)

*Primary Examiner* — Robert Beausoliel, Jr.
*Assistant Examiner* — Susan Rayyan
(74) *Attorney, Agent, or Firm* — Alston & Bird LLP

(57) ABSTRACT

Custom geographic databases are created by analyzing a geographic database to determine database structure elements. The database structure elements may involve road attributes or points of interest. Database structure elements are then selected to include in a customized geographic database. A customized geographic database is created that includes the selected database structure elements.

19 Claims, 8 Drawing Sheets

(56) References Cited

U.S. PATENT DOCUMENTS

| | | | |
|---|---|---|---|
| 2009/0292457 A1* | 11/2009 | Ford | G01C 21/26 701/532 |
| 2010/0011018 A1* | 1/2010 | Pomponio | 707/102 |
| 2010/0161211 A1* | 6/2010 | Chang | 701/201 |
| 2011/0055224 A1* | 3/2011 | Rossio | G01C 21/32 707/749 |
| 2011/0066657 A1* | 3/2011 | Weiland | G06F 17/30241 707/803 |
| 2011/0184636 A1* | 7/2011 | Rolf et al. | 701/200 |
| 2011/0196602 A1 | 8/2011 | Pfeifle et al. | |
| 2011/0196889 A1 | 8/2011 | Pfeifle et al. | |
| 2011/0196890 A1 | 8/2011 | Pfeifle et al. | |
| 2012/0011178 A1 | 1/2012 | Pfeifle et al. | |
| 2012/0036150 A1 | 2/2012 | Richter et al. | |
| 2013/0024108 A1* | 1/2013 | Grun | 701/424 |
| 2013/0132398 A1* | 5/2013 | Pfeifle | G06F 17/30241 707/745 |
| 2013/0325908 A1* | 12/2013 | Verschoor | G06F 17/30159 707/812 |
| 2014/0005919 A1* | 1/2014 | Mattila | G01C 21/00 701/408 |
| 2014/0095303 A1* | 4/2014 | Jones | G06F 17/30867 705/14.49 |
| 2014/0101096 A1* | 4/2014 | Pfeifle | G06F 17/30575 707/609 |
| 2014/0236937 A1* | 8/2014 | Hohs | G06F 17/30241 707/724 |
| 2014/0372487 A1 | 12/2014 | Pfeifle | |
| 2015/0185990 A1* | 7/2015 | Thompson | G06F 3/0484 715/800 |

FOREIGN PATENT DOCUMENTS

| | | |
|---|---|---|
| EP | 2363816 A1 | 9/2011 |
| WO | 2013057986 A1 | 4/2013 |
| WO | 2013075987 A1 | 5/2013 |

OTHER PUBLICATIONS

European Search Report in EP Patent application No. 14167470.5, dated Feb. 11, 2015, 5 pages.

* cited by examiner

NAVIGATION DATABASE CUSTOMIZATION

BACKGROUND

The following disclosure generally relates to navigation database creation, and, more particularly, to creating a customized navigation database.

Navigation systems may be provided on various different computer platforms. For example, a navigation system may be a standalone system or a networked system. In a standalone navigation system, the software applications, geographic data, and hardware are combined at a single location. The standalone system may be installed in a vehicle or carried by a person. In a networked navigation system, some of the software or geographic data is located with the hardware with the user and some of the software or geographic data is/are located remotely and accessed over a communications system. The navigation system may be implemented on a dedicated platform in which the hardware and software are specifically designed for navigation purposes. Alternatively, the navigation system may be implemented on a general purpose computing platform (such as a personal computer, personal digital assistant, smart phone, or a networked computer) using appropriate navigation-related software applications and data.

Navigation systems (including general purpose computing platforms that run navigation applications) provide a variety of useful features and services. For example, navigation systems used in vehicles can provide detailed instructions for driving to desired destinations, thereby reducing travel times and expenses. Navigation systems and navigation applications can also search for businesses of a desired type and provide routing guidance to locations of such businesses.

Navigation systems may include navigational databases as a collection of geographic data to be used with a navigational system. Navigation system users may require that certain types, categories, or configurations of geographic data are included in a navigational database. These different requirements can lead to numerous versions of compiled navigation databases produced by navigation system producers.

SUMMARY

In an embodiment a method involves analyzing a geographic database to determine database structure elements. The database structure elements may involve road attributes or points of interest. The method also involves electing database structure elements to include in a customized geographic database, wherein at least one database structure element is omitted from the customized geographic database. Further, the method involves creating the customized geographic database, excluding the at least one database structure element omitted from the customized geographic database.

In an embodiment, an apparatus has a memory configured to store a geographic database and a customized geographic database. The apparatus also has a processor configured to analyze the geographic database to determine database structure elements, wherein the database structure elements comprise road attributes or points of interest. The apparatus further has a display operable to present database structure elements to a user, and an input device operable to allow the selection of at least one database structure element to include in the customized geographic database. The processor can be further configured to modify the geographic database to create the customized database comprising the at least one selected database structure element.

In an embodiment, a non-transitory computer readable medium including instructions that when executed are operable to cause a processor to analyze a geographic database to determine database structure elements. The database structure elements may be road attributes or points of interest. The instructions are further operable to select database structure elements to include in a customized geographic database. The instructions are also operable to create the customized geographic database from the customized geographic database comprising the selected database structure elements.

BRIEF DESCRIPTION OF THE DRAWINGS

Exemplary embodiments of the present invention are described herein with reference to the following drawings.

DETAILED DESCRIPTION OF THE PRESENTLY PREFERRED EMBODIMENTS

Figure 1:
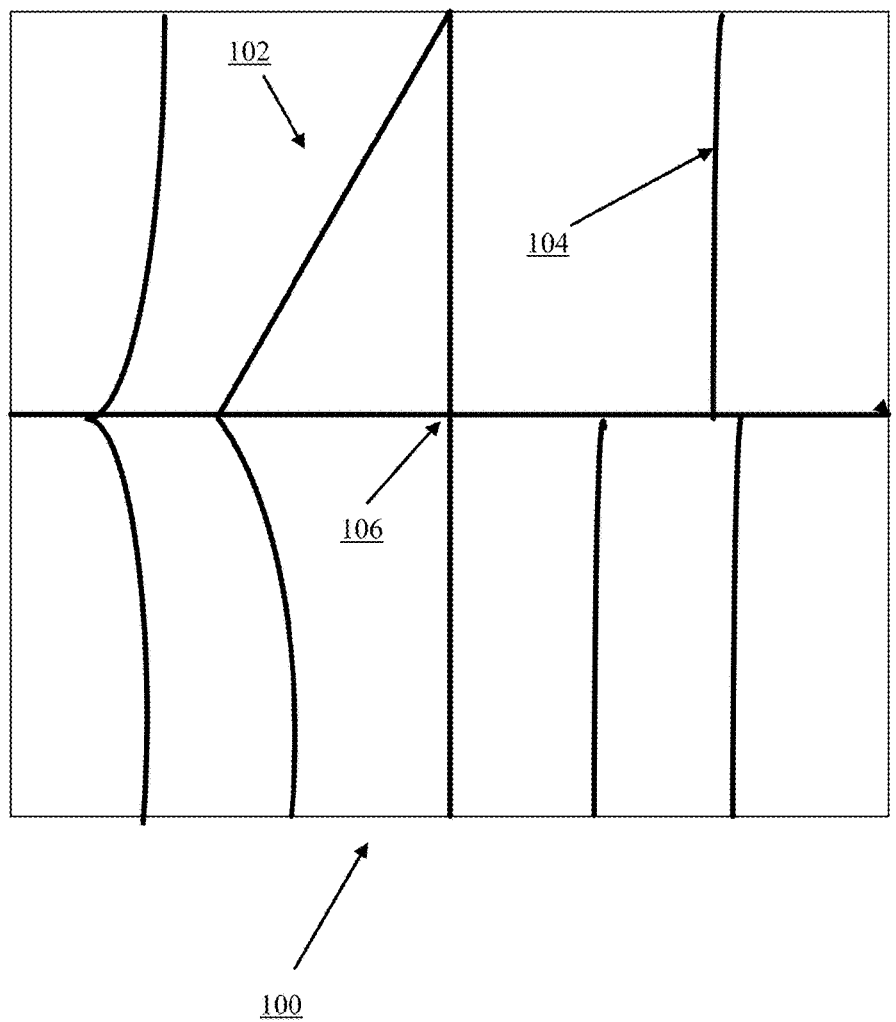
FIG. 1 is diagram illustrating a geographic region.

Navigational databases may be provided for users in a fully compiled and functional form after the navigational database developer has fully developed the database using the user's requirements. These requirements may involve multiple iterations to determine the optimum level of geographic detail required by the user. Navigational database users also may have file size requirements for the database, which may limit the amount of geographic detail contained in a fully compiled and functional navigational database as provided to a user.

Editing the level of content and detail in a geographic or navigational database allows users to customize a navigational database after the database has been provided to the user.

Editing the level of content in a compiled and functional database can be performed several ways. One way of doing this would be to use an adaptation compiler on a general purpose geographic database that includes significantly more content and detail than is expected to be needed by the user. The general purpose geographic database may not contain any project specific adaptations, but contains all necessary data required for project-specific compiled databases. The adaptation compiler may then operate on the general purpose geographic database to remove content from the general purpose database to create an adapted, customized, geographic database for the specific user project.

The adaptation compiler may involve a template of settings to guide the selection of content for the customized database. This template of settings may include packages of settings and content designed for specific geographic database uses. For example, a package may be designed for a geographic database to be used for ambulance drivers. Such a package may automatically include, or pre-select, content to include that would be most useful for ambulance driving purposes. Such content may include hospitals, road intersections with emergency controlled traffic lights, historical road segment travel times, or any other content that may be considered useful for the intended purpose or use of the geographic database. The template may be used as a starting point for a user. The user may use the adaptation compiler to modify the content of the packages, or specific geographic databases iteratively to develop the most efficient and useful geographic database for the user's purpose. An adaptation compiler may include multiple templates or packages, such as packages designed for delivery drivers, police officers, or general travelers. The templates may be provided as a part of, or ancillary to, the adaptation compiler. Using such an adaptation compiler, the iterative process of customization may be performed external to the geographic database supplier or original creator.

Another way of editing the level of content and detail in a geographic database is to provide a generic intermediate database product to a user instead of a fully compiled database product. The basic idea of the generic intermediate product approach is that supplier side compilation process is stopped at an intermediate compiled format. Such a format might be a relational representation of the compiled format without any system-specific settings. Such an intermediate compiled format could be exported from a geographic database provider's compiler environment, e.g. Oracle, and store it in SQLite files. These files may be sent to a user along with an adaptation compiler to further process the intermediate format into the final format required by the user.

FIG. 1 is diagram illustrating a geographic region 100. The region 100 may be a country (e.g., France), state (e.g., Illinois), province, city (e.g., Chicago), metropolitan area (e.g., the New York metropolitan area), county (e.g., Cook County, Ill.), any other municipal entity, or any other area of comparable or different size. Alternatively, the geographic region 100 may be a combination of one or more countries, states, cities, metropolitan areas, and so on. The region 100 may also represent locations without reference to geopolitical boundaries, such as being a rectangular regions centered on or relative to a particular point or location. The region 100 includes a road network 102. The road network 102 may include, among other things, a plurality of road segments 104 connected at intersections 106 throughout the region 100. Though not depicted herein, the region 100 may also include one or more points of interest, such as businesses, municipal entities, tourist attractions, and/or other points of interest, one or more topographical features (e.g., ponds, lakes, mountains, hills, etc.) of the geographic region 100, pedestrian network having sidewalks and pedestrian paths, a bicycle network having bike paths, bike lanes on road segments, and/or road segments appropriate for bicycle travel, and/or a public transit network including, for example, railroads, public bus lines, tourist bus lines, metro railway lines (e.g., subways and elevated lines), light rail (e.g., trams, trolleys, or street cars), water taxi, and stations and/or stops for one or more of each. The region 100 may include other networks, features, and/or points as well.

Figure 2:
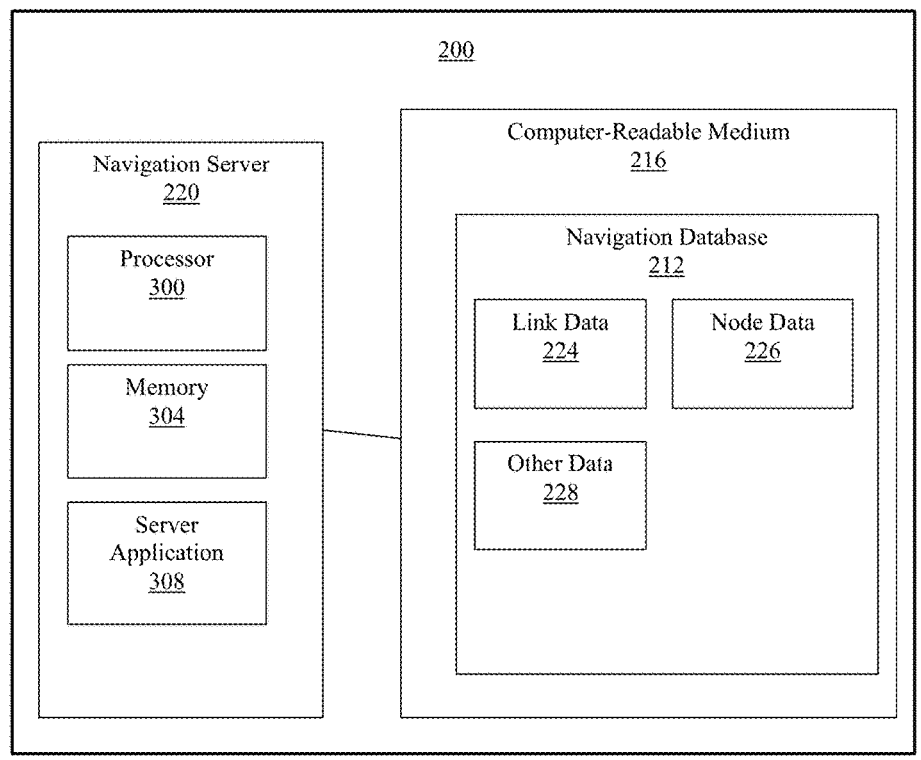
FIG. 2 depicts a block diagram of an exemplary navigation system for navigation database customization.

FIG. 2 depicts a block diagram of an exemplary navigation system which may be used for navigation database customization. Embodiments may be implemented by a navigation system 200 is created or provided by a navigation system provider (e.g., NAVTEQ or Nokia Corp.) and may be used by or in connection with a mobile device, such as a mobile phone, a personal digital assistant, a tablet computer, a notebook computer, a personal navigation device, a portable navigation device, and/or any other portable or mobile device. In some embodiments, the navigation system 200, and components thereof, may be partially or fully located within or be part of the mobile device. For example, the mobile device may contain the navigation system 200. In other embodiments, the navigation system 200 (or individual components thereof, as described below) may be implemented as computer program logic or computer readable program code stored in the memory and/or storage of a computer, such as the computer 500 described below with respect to FIG. 4, and executable by one or more processors thereof to implement the disclosed functionality.

The navigation system 200 generally includes a navigation database 212 stored on a computer readable medium 216. The computer readable medium 216 may include one or more hard drives or other storage medium. The system 200 further includes a navigation server 220 that may access the computer readable medium 216. In other embodiments, the server 220 may be part of or separate (e.g., remote) from the database 212.

The navigation database 212 stores or maintains geographic data such as, for example, road segment or link data records 224 and node data records 226. The link data records 224 are links or segments representing the roads, streets, or paths 104. The node data records 226 are end points (e.g., the intersections 106) corresponding to the respective links or segments of the road segment data records 224. The road link data records 224 and the node data records 226 may represent, for example, the road network 102 or other road networks used by vehicles, cars, and/or other entities. The road link data records 224 may be associated with attributes of or about the roads 104, such as geographic coordinates, street names, address ranges, speed limits, turn restrictions at intersections, and other navigation related attributes (e.g., one or more of the road segments 104 is part of a highway or tollway, the location of stop signs and/or stoplights along the road segments 104, etc.), as well as points of interest (POIs), such as gasoline stations, hotels, restaurants, museums, stadiums, offices, automobile dealerships, auto repair shops, buildings, stores, parks, etc. The node data records 226 may likewise be associated with attributes (e.g., about the intersections 106), such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic data may additionally or alternatively include other data records, such as, for example, POI data records, topographical data records, cartographic data records, routing data, and maneuver data. Other data 228 relating to a geographic region or area may also be included in a navigation database, such as population data, user reviews of POIs, traffic data, or any other data relating to a geographic region. Geographic data as described above may be in the form of database structure elements. For example, navigation attributes, road attributes, and POIs may be considered database structure elements. Collections of geographic data may also be considered database structure elements.

The navigation server 220 includes a processor 300, a memory 304, and a server application 308. In other embodiments, the navigation server 220 may include additional, different, or fewer components. For example, the server 220 may include additional processors 300, memories 304, and server applications 308.

The processor 300 may be a general processor, a digital signal processor, application specific integrated circuit (ASIC), field programmable gate array, graphics processing unit, analog circuit, digital circuit, combinations thereof, or other now known or later developed processor. The memory 304 may be a volatile memory or a non-volatile memory. The memory 304 may include one or more of a read only memory (ROM), random access memory (RAM), a flash memory, an electronic erasable program read only memory (EEPROM), or other type of memory. The memory 304 may include an optical, magnetic (hard drive) or any other form of data storage device. The server application 308 may be stored on the memory 304 operated by the server 220 and loaded into the memory 304 of the server 220 to be executed by the processor 300. The server application 308 is operative to obtain or access the geographic data, particularly the data records 224 226 and 228, stored or maintained in the navigation database 212.

In an embodiment, the processor 300 is configured to analyze the navigation database 212 to determine database structure elements. The processor 300 may also be configured to select determined navigation database 212 structure elements to include in a customized geographic database. The processor may also be configured to create the customized geographic database using the selected structure elements. The customized geographic database may be stored in the memory 304, or it may be stored on the computer readable medium 216. The customized geographic database may also replace the navigation database 212 on the computer readable medium 212. The customized geographic database may also contain link data 224, road data 226, and other data 228.

Figure 3:
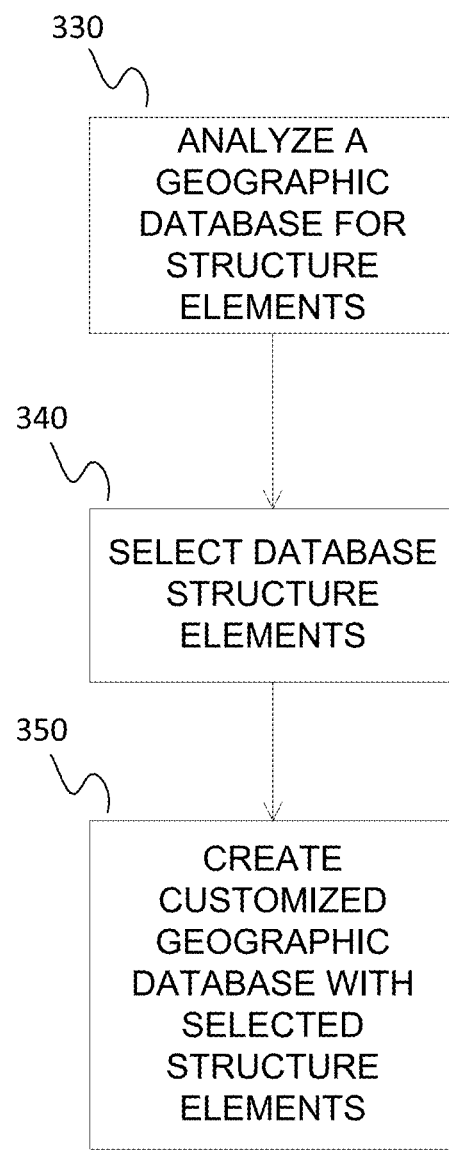
FIG. 3 depicts an example block diagram for navigation database customization.

FIG. 3 depicts a block diagram of an exemplary navigation database customization method. The embodiments disclosed below may be implemented as computer program logic or computer readable program code stored in the memory and/or storage of a computer, such as the computer 500 described below with respect to FIG. 4, and executable by one or more processors thereof to implement the disclosed functionality.

At step 330 a geographic database is analyzed to determine database structure elements that are contained in the geographic database. The geographic database may be a fully compiled Navigation Database Standard (NDS), which is described in the NDS Format Specification, Version 2.2.1, published by NDS e.V and which is hereby incorporated by reference herein in its entirety. The geographic database may also be a Map Positioning Engine (MPE) database consisting primarily of road link and node attributes. The geographic database may also be a partially constructed collection of data that has not been compiled into a geographic database useable by a navigation system.

The geographic database includes geographic data used for mapping and navigation-related applications. The geographic database can include geographic data relating to a geographic area such as the geographic region depicted in FIG. 1. The geographic data may include data representing a road network including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may also include points of interest and categories of points of interest.

Database structure elements may include database building blocks, such as all data relating to a geographic area as represented in a geographic database, database features, such as road segments, navigation path links, road junction views, road junction objects, or full test search indexes. In an embodiment, database structure elements may include database attributes, such as slope, curvature, or speed limits associated with road segments. Database structure elements may also include attribute groups or categories. Database structure elements may also include points of interest or categories of points of interest.

The geographic database may be analyzed using any known method to determine database structure elements. For example, database structure elements may be listed in the metadata of the geographic database, and the metadata may be analyzed to determine the database structure elements.

In another embodiment, the database structure elements may be determined using reflection techniques. Reflection techniques can be used for observing and/or modifying program execution at runtime. A reflection-oriented technique involves monitoring the execution of an enclosure of code, such as a compiled geographic database, and determining the structure and elements of the enclosure of code based on the execution of the code. In object oriented programming languages such as Java reflection allows inspection of classes, interfaces, fields and methods at runtime without knowing the names of the interfaces, fields, methods at the time the enclosure of code is compiled. Reflection techniques may also be used with many programming languages. For example, reflection techniques may be used with scripting and programming languages such as ECMAScript, PHP, Objective-C, Ruby, or Python.

At step 340 database structure elements determined at step 330 are selected to be included in a customized geographic database. In an embodiment, the database structure elements may be presented to a user using a computer program with a graphical user interface, wherein the user can select which database structure elements to include in the customized geographic database. The database structure elements may also be selected automatically based on a preferred database profile or preferences for a user which has predetermined database structure elements or database structure element categories to include in a customized geographic database.

At step 350 a customized geographic database is created from the database structure elements selected in step 340. The customized geographic database may be a geographic database in any form. For example, the customized geographic database may be a compiled Navigation Database Standard (NDS) or Map Positioning Engine (MPE) database, usable by a navigation system.

Figure 4:
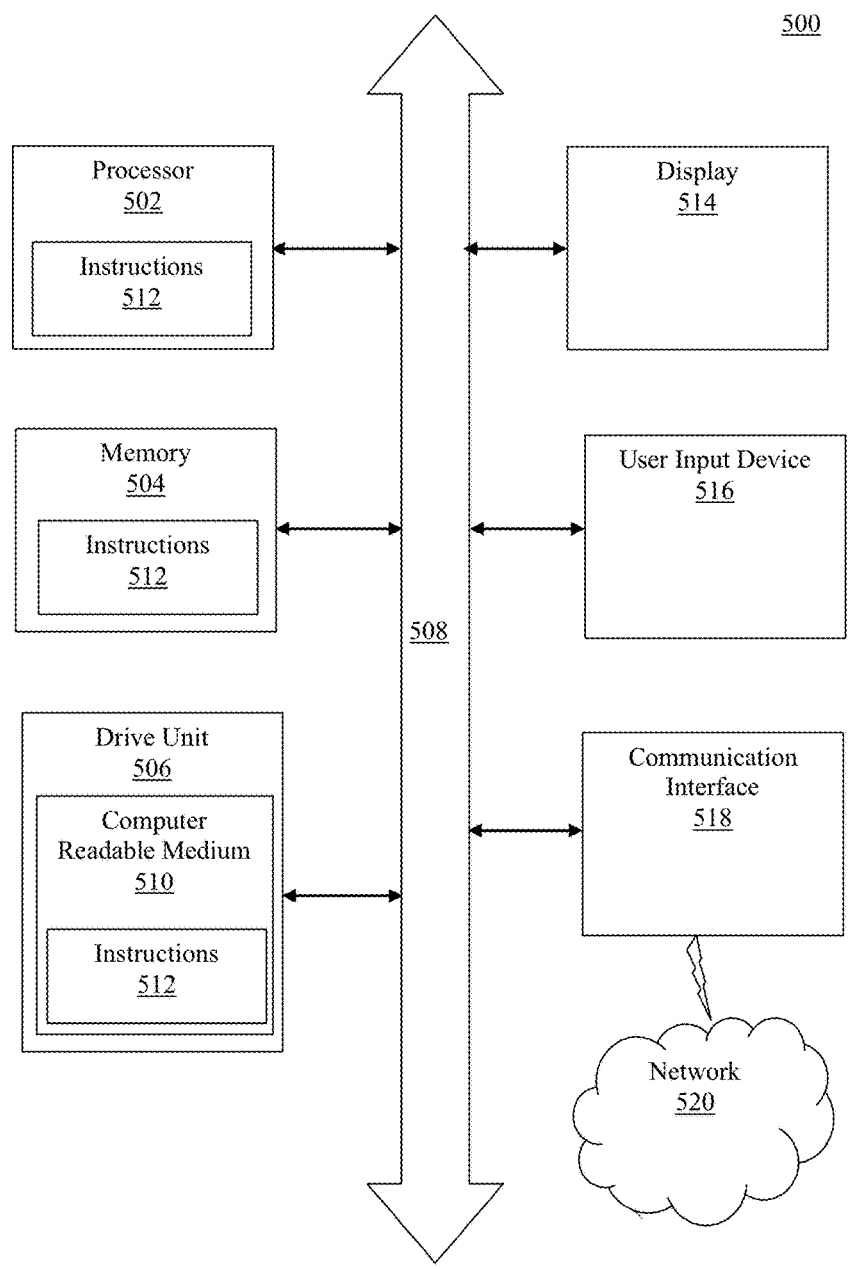
FIG. 4 depicts an illustrative computer system for navigation database customization.

FIG. 4 depicts an illustrative computer system 500 for navigation database customization. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices. Any of the components discussed above may be a computer system 500 or a component in the computer system 500.

In a networked deployment, the computer system 500 may operate in the capacity of a server or as a client user computer in a client-server user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 4, the computer system 500 may include a processor 502, e.g., a central processing unit (CPU), a graphics processing unit (GPU), or both. The processor 502 may be a component in a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may implement a software program, such as code generated manually (i.e., programmed).

The computer system 500 may include a memory 504 that can communicate via a bus 508. The memory 504 may be a main memory, a static memory, or a dynamic memory. The memory 504 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 504 includes a cache or random access memory for the processor 502. In alternative embodiments, the memory 504 is separate from the processor 502, such as a cache memory of a processor, the system memory, or other memory. The memory 504 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 504 is operable to store instructions executable by the processor 502. The functions, acts or tasks illustrated in the figures or described herein may be performed by the programmed processor 502 executing the instructions stored in the memory 504. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 500 may further include a display unit 514, such as a liquid crystal display (LCD), an organic light emitting diode (OLED), a flat panel display, a solid state display, a cathode ray tube (CRT), a projector, a printer or other now known or later developed display device for outputting determined information. The display 514 may act as an interface for the user to see the functioning of the processor 502, or specifically as an interface with the software stored in the memory 504 or in the drive unit 506.

Additionally, the computer system 500 may include an input device 516 configured to allow a user to interact with any of the components of system 500. The input device 516 may be a number pad, a keyboard, or a cursor control device, such as a mouse, or a joystick, touch screen display, remote control or any other device operative to interact with the system 500.

In a particular embodiment, as depicted in FIG. 4, the computer system 500 may also include a disk. The drive unit 506 may be an optical drive unit. The disk drive unit 506 may include a computer-readable medium 510 in which one or more sets of instructions 512, e.g. software, can be embedded. Further, the instructions 512 may embody one or more of the methods or logic as described herein. In a particular embodiment, the instructions 512 may reside completely, or at least partially, within the memory 504 and/or within the processor 502 during execution by the computer system 500. The memory 504 and the processor 502 also may include computer-readable media as discussed above.

The present disclosure contemplates a computer-readable medium that includes instructions 512 or receives and executes instructions 512 responsive to a propagated signal, so that a device connected to a network 520 can communicate voice, video, audio, images or any other data over the network 520. Further, the instructions 512 may be transmitted or received over the network 520 via a communication port 518. The communication port 518 may be a part of the processor 502 or may be a separate component. The communication port 518 may be created in software or may be a physical connection in hardware. The communication port 518 is configured to connect with a network 520, external media, the display 514, or any other components in system 500, or combinations thereof. The connection with the network 520 may be a physical connection, such as a wired Ethernet connection or may be established wirelessly as discussed below. Likewise, the additional connections with other components of the system 500 may be physical connections or may be established wirelessly.

The network 520 may include wired networks, wireless networks, or combinations thereof, and may be representative of the networks 162 and/or 164. The wireless network may be a cellular telephone network, an 802.11, 802.16, 802.20, or WiMax network. Further, the network 520 may be a public network, such as the Internet, a private network, such as an intranet, or combinations thereof, and may utilize a variety of networking protocols now available or later developed including, but not limited to TCP/IP based networking protocols.

In an embodiment, the memory 504 is configured to store a geographic database. The processor 502 is configured to analyze the geographic database to determine database structure elements that exist in the geographic database. The display 514 is operable to present the database structure elements determined by the processor 502 to a user. The user input device 516 is operable to allow the selection of at least one database structure element to include in the customized geographic database. The processor 502 is also configured to modify the geographic database to create a customized database that includes the at least one database structure element selected by the user. The memory 504 is also configured to store the created customized geographic database.

In an embodiment the display 514 is operable to display a graphical user interface (GUI) to present database structure elements. The user input device may also be used to select database structure elements using the GUI.

In an embodiment, the communication interface 518 is operable to communicate a customized geographic database to a device separate from system 500, such as a mobile device. In an embodiment the customized geographic database may be communicated via the network 520.

In an embodiment the drive unit 506 may be configured to store the geographic database and the customized geographic database on the computer readable medium 510.

Figure 5:
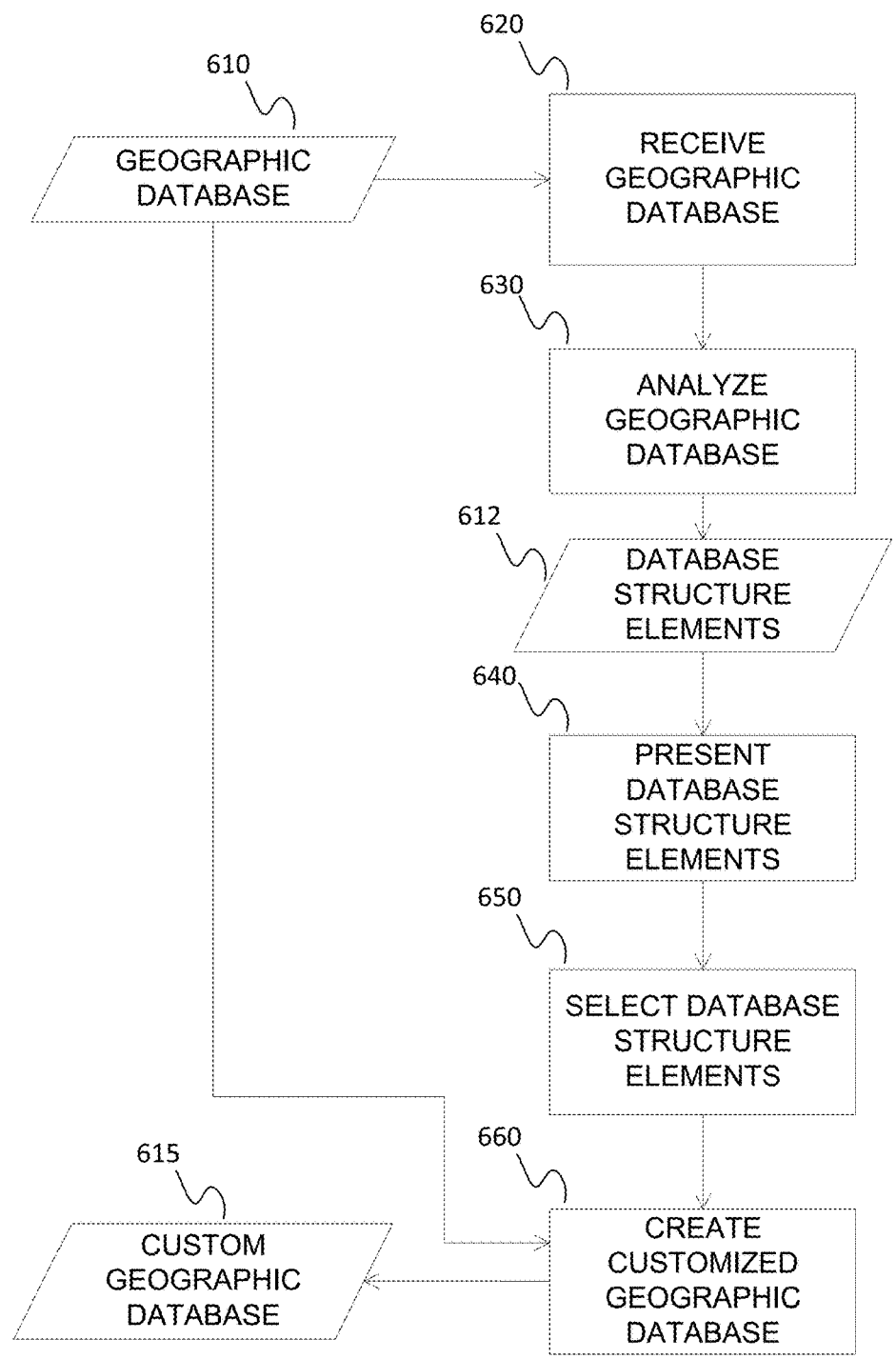
FIG. 5 depicts another example block diagram for navigation database customization.

In an embodiment, the instructions 512 may consist of instructions consistent with the methods presented and described with respect to FIG. 3 above, or FIG. 5 to follow.

FIG. 5 depicts a block diagram of an exemplary navigation database customization method.

At step 620 a geographic database 610 is received. The geographic database 610 may be received from a geographic database vendor and communicated through a network to a geographic database customization device. The geographic database 610 may be any format. The geographic database 610 may be a fully compiled Navigation Database Standard (NDS). The geographic database may also be a Map Positioning Engine (MPE) database. The geographic database may also be a partially constructed collection of data that has not been compiled into a geographic database useable by a navigation system.

At step 630 the geographic database 610 is analyzed to determine database structure elements 612 of the geographic database 610. Database structure elements 610 may include database building blocks, such as all data relating to a geographic area as represented in a geographic database, database features, such as road segments, navigation path links, road junction views, road junction objects, or full test search indexes.

In an embodiment, database structure elements 612 may include database attributes, such as slope, curvature, or speed limits associated with road segments. Database structure elements 612 may also include attribute groups or categories. Database structure elements 612 may also include points of interest or categories of points of interest.

In an embodiment, the database structure elements 612 may be determined to be arranged in groups to form a hierarchy of database structure elements 612. For example, the geographic database 610 may be structured such that database features are grouped into database attributes, and database attributes are grouped into larger database building blocks, and so on. In such an embodiment, step 630 may involve determining the hierarchal structure and groupings.

In an embodiment, such as may exist with an MPE database, step 630 involves determining the base features of the geographic database 610. In other embodiments, step 630 may involve determining the higher level hierarchal groupings of features.

The geographic database may be analyzed to determine database structure elements 612. The geographic database may be analyzed by any technique that allows for the determination of database structure elements 612 in the geographic database 610. For example, database structure elements 612 may be listed in the metadata of the geographic database, such as in an SQLite file, and the metadata may be analyzed to determine the database structure elements. Reflection techniques may also be used to determine database structure elements 612. In another embodiment, metadata analysis may be used along with reflection techniques to determine database structure elements 612 in the geographic database 610.

At step 640 the database structure elements 612 may be presented to a user. The database structure elements 612 may be presented in any format such as a list of structure elements 612. The database structure elements may also be presented in a graphical or visual format that appropriately communicates and hierarchal structures or groupings that may exist with the database structure elements 612. A graphical format for presentation of database structure elements 612 may involve a graphical user interface displayed using a display of a computer or comparable device.

At step 650 database structure elements 612 are selected to be included in a custom geographic database 615. The selection may be manual or automatic. The selection of database structure elements 612 to include may be guided by a pre-determined preferences or listing of categories of database structure elements 612 to include in a custom geographic database 615 for a particular user or group of users. For example, custom geographic databases 615 compiled for use by police officers or ambulance drivers may typically require different database structure elements 612 than a custom geographic database 615 designed for use by delivery truck drivers. As such, an automatic method may involve automatically including database structure elements 612 pre-determined to be needed in a police/ambulance database. These database structure elements 612 may include all hospitals or police stations of a geographic region, and these database structure elements 612 may be automatically selected.

The selection of database structure elements 612 may also be manual. For example, a user may select the database structure elements 612 to include in a custom geographic database using a graphical user interface (GUI).

Similarly, database structure elements 612 may not be selected for inclusion into a custom geographic database 615. An embodiment may provide that selecting database structure elements 612 to include in a custom geographic database may involve choosing which database structure elements 612 to not include in the custom geographic database 615.

Database structure elements 612 that involve hierarchal groupings or structure may be organized for selection in a manner that would allow for the selection of a greater category or group of more subordinate database structure elements 612. If a master database structure element 612 that is a group of multiple subordinate database structure elements 612 is selected, all of the subordinate database structure elements 612 would also be selected. For example, if a category of hospitals is selected that included all of the hospitals of a geographic region all of the hospitals in the geographic region would be included in the selection. Similarly, not selecting a master database structure element 612 may indicate that none of the associated subordinate database structure elements 612 would be selected.

At step 660 a custom geographic database 615 is created. The custom geographic database includes the database structure elements 612 selected in step 650, and excludes the database structure elements 612 not selected in step 650. Inversely, an embodiment may provide that the custom geographic database includes the database structure elements 612 not selected in step 650, and excludes the database structure elements 612 selected in step 650.

The custom geographic database 615 may be an entirely new database, created using the database structure elements 612 selected in step 650. Alternatively, embodiments may provide that the geographic database 610 is modified to form the custom geographic database 615.

The custom geographic database 615 may be a geographic database in any format. The custom geographic database 615 usable may be a compiled geographic database usable by a navigation system, such as a compiled NDS or MPE database.

Figure 6:
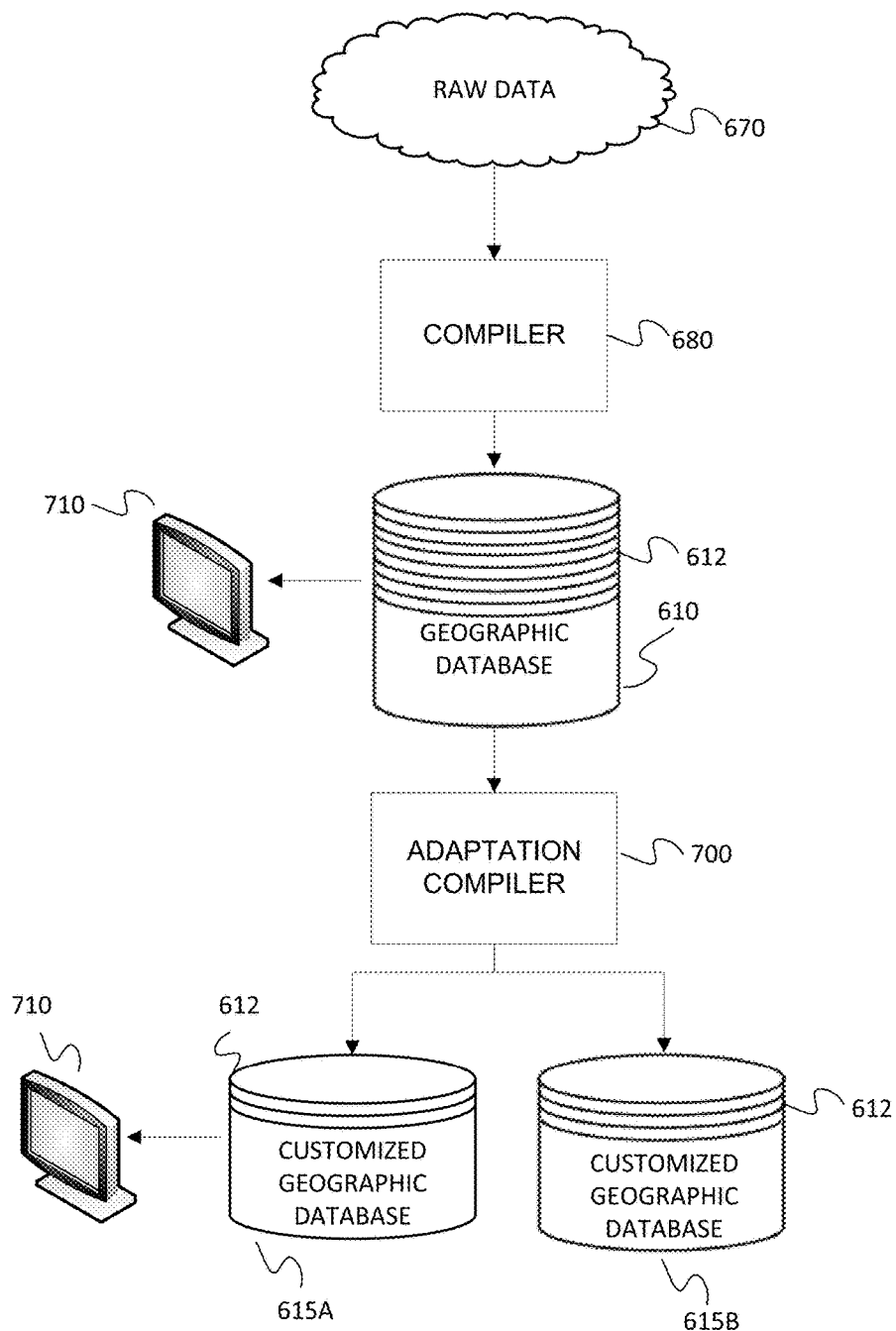
FIG. 6 depicts an exemplary navigation database customization system.

FIG. 6 depicts an exemplary navigation database customization system. In an embodiment, raw geographic data 670 is compiled using a compiler 680 into a geographic database 610 that includes database structure elements 612. The geographic database 610 is in a form that is usable by a navigation system 710. In another embodiment the geographic database may be a combination and organization of the raw data 670 that is not in a form that is usable by a navigation system 710, but still includes database structural elements 612.

The compiler 680 may be a computer program (or set of programs) that transforms source code written in a programming language (such as JAVA) into another computer language or form. Generally a compiler is used to transform raw data 670 into a geographic database 610.

In an embodiment the geographic database 610 is then operated on by the adaptation compiler 700 to create a customized geographic database 615. The customized geographic database is in a form that is usable by a navigation system but consist of a different amount of data than the geographic database 610. For example, a customized geographic database 615 may require less memory to store than the geographic database 610, and thus may operate more efficiently and effectively within a navigation system 710. A customized geographic database 615 may also involve fewer options to process by a navigation system 710 than the geographic database 610. A customized geographic database 615 may then be more functional or desirable for users with various uses and requirements of a navigation system 710.

The adaptation compiler 700 may be functional to read out the database structure elements 612 such as the type of tables and binary large object (BLOB) structures of a geographic database 610. For example, specific tables and table names may be read from the geographic database 610. For each BLOB in a table, the adaptation compiler 700 may present all link attributes and link attribute combinations which can be found in any of the BLOBs. The adaptation compiler 700 can either derive this information from the metadata of the files, where all these attributes are commonly listed, or it can scan all the BLOBs of this type and list the attributes and attribute combinations found in any of the BLOBs by utilizing reflection techniques. Different flexible attributes and attribute groups, as well as attribute maps of the attribute relationships, may be found in each table.

The determined structure elements 612 may be output or stored in any format for use by the adaptation compiler 700. For example, the determined database structure elements 612 may be output as a listing in a text file accessible by the adaptation compiler 700. The determined database structure elements 612 may also be stored in a relational database so that the adaptation compiler 700 can query the relational database to read the determined database structure elements 612 in the geographic database 610.

The adaptation compiler 700 may present the attributes, attribute groups, and maps of the attribute structure to a user so that the user can select which attributes/attribute groups to store in a customized geographic database. The adaptation compiler 700 may select automatically, or allow a user to select, which attributes to include in a customized geographic database 615. The adaptation compiler 700 may generate the customized geographic database 615 based on the selected attributes to include. Generally, attributes, attribute groups or attribute maps which are not selected will be removed from the customized geographic database 615. Thus, the customized geographic database may be smaller (and more efficient) than the original geographic database 610.

In an embodiment, storing the determined database structure elements 612 in a relational database may allow the adaptation compiler 700 to additionally aggregate similar database structure elements 612. For example, if a geographic database 610 is determined to have a speed limit associated with each road segment in the geographic database 610, then the adaptation compiler 700 can aggregate or group all of the speed limit database structure elements into a speed limit attribute group using a database querying language, even if the speed limit attribute group did not previously exist as a database structure element. The adaptation compiler 700 may then be able to create a customized geographic database 615 that includes or excludes all speed limit database structure elements based on a selection of the speed limit attribute group. This would avoid the need to select each speed limit database structure element individually for inclusion or presentation.

Embodiments may provide that the adaptation compiler is capable of performing off-line or on-line. An off-line embodiment involves adaptation of a geographic database 610 in a tailor made or post-compilation step. An on-line embodiment may involve performing a geographic database 610 adaptation on the target device directly. The application, i.e. a navigation system or an MPE application, can retrieve data from a generic database as is required by the application. Thus, customization may happen in the access library of the application rather than in an off-line compiler or post-compiler step.

In an embodiment an adaptation compiler 700 operates on a geographic database 610 by analyzing the geographic database 610 and determining which database structure elements 612 of the geographic database 610 to include in a customized geographic database 615. The adaptation compiler 700 may create multiple customized geographic databases 615A and 615B. Each customized geographic database 615A and 615B may have different database structure elements 612 from the geographic database 610 included. For example, a customized database 615A may have ultimately fewer or different database structure elements 612 than a different customized geographic database 615B, and may be customized for different functions and navigation systems 710. For example, a customized geographic database 615A may be intended for use with utility maintenance crews, and may include database structure elements 612 such as electric substations or utility switching stations. Whereas another customized geographic database 615B may be intended for use by traveling salesmen, and may include database structure elements 612 such as speed limits for road segments or road intersection views. Embodiments provide that both customized geographic databases 615A and 615B may be created by the same adaptation compiler 700 and input geographic database 610. As such, numerous customized geographic databases 615 may be configured and created by an adaptation compiler 700. An adaptation compiler 700 may also be used iteratively by a user, or an organization, to develop and fine tune a customized geographic database that efficiently meets the criteria and functional requirements of the user or organization.

In an embodiment involving MPE databases which typically only contain ADAS (Advanced Driver Assistance Systems) data, the adaptation compiler 700 can provide a listing of all attributes and attribute groups and allowing for attribute or attribute group removal from a customized geographic database 615. In an embodiment involving an NDS database, the adaptation compiler 700 may require more functionality and permit removing/adapting building-block-specific structures which exceed the complexity of link attributes.

In an embodiment where the geographic database 610 is an NDS database it may not be adequate to remove only attributes or attribute groups. For NDS databases it is also necessary that, for each NDS building block, building-block-specific functionality is included for transforming the data of a building block. For example, in an NDS street name building block, it may be necessary for the adaptation compiler 700 to list all available destination input paths, e.g. Country→City→Road, Country→Street, Country→Postal code→Street, City→Street, Country→Scenic-Routes, etc. The adaptation compiler 700 may allow the removal of the undesired content. Similar concepts may exist for a full-text search NDS building block. The adaptation compiler 700 may list all available full-text search indexes and allow removing them in a customized geographic database 615. Similar functionality may be provided for other NDS building blocks such as Junction Views and Motorway Junction Objects. NDS building blocks should be removable if they are not required. For POIs, the adaptation compiler 700 may allow remapping existing categories into customer-specific ones and allow removing unwanted categories. For example, an automotive manufacturer may want to change the POI's included in a POI category of auto dealers, and only include dealers for a specific auto manufacturer in a customized geographic database.

Figure 7:
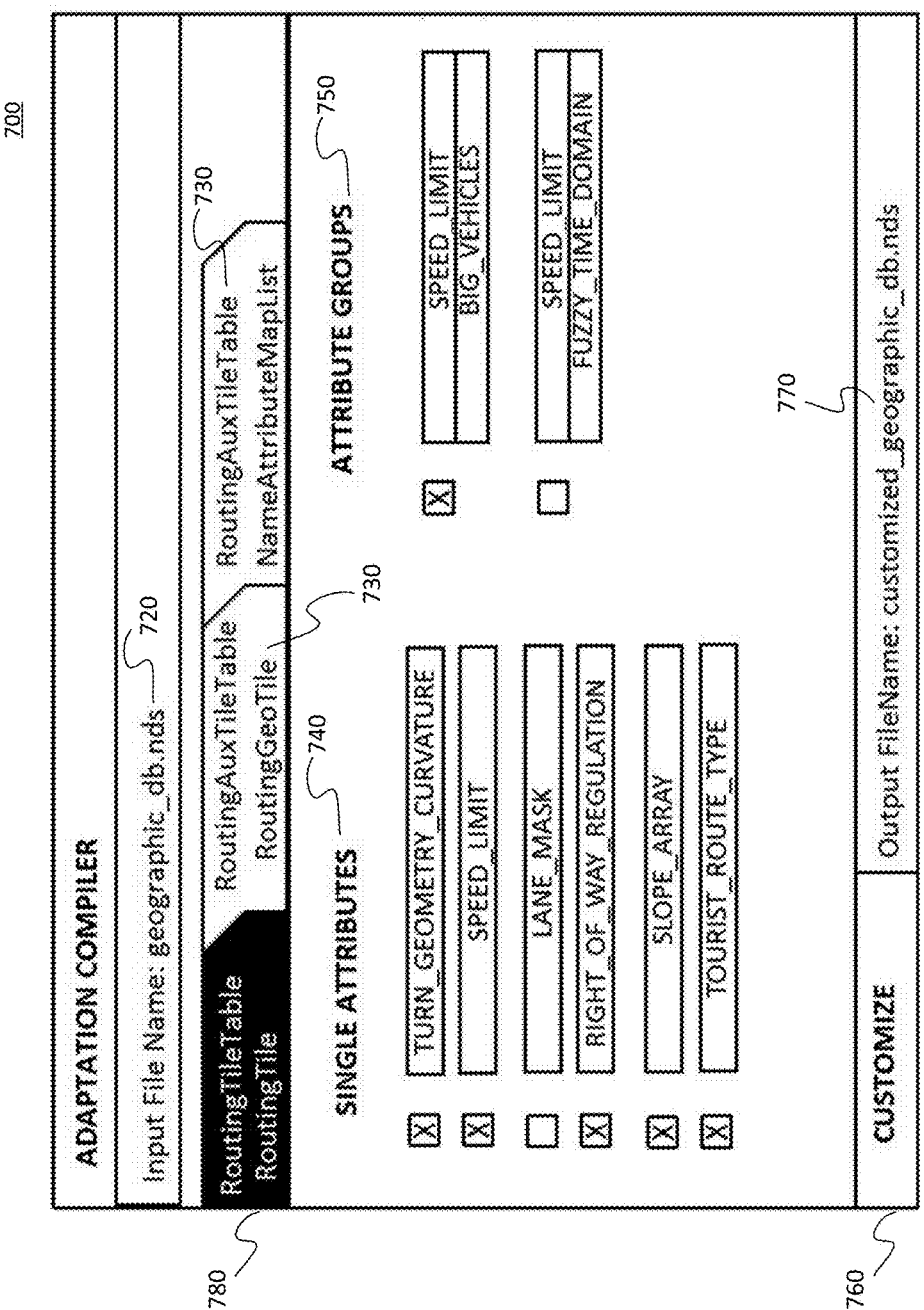
FIG. 7 depicts an exemplary interface with a database customization system.

FIG. 7 depicts an exemplary interface with a database customization system. The interface may be a Graphical User Interface (GUI) used with an adaptation compiler 700. The GUI indicates that a geographic database 720 has been received or chosen for customization by the adaptation compiler 700. The adaptation compiler 700 has analyzed the geographic database 720 and determined that the geographic database included multiple database structure elements. The determined database structure elements include tables 730, attribute groups 750, and single attributes 740. The GUI has displayed the database structure elements in a hierarchal structure to indicate that the tables 730 include single attributes 740 and attribute groups 750. The GUI may allow that a different table tab 780 is selected to display the single attributes 740 and attribute groups 750 that exist in a different table 730 of the geographic database 720. Single attributes 740 and attribute groups 750 are selected for inclusion in the customized geographic database output 770. For example, the adaptation compiler 700 may create the customized geographic database 770 to include single attributes 740 such as the selected TURN_GEOMETRY_CURVATURE, SPEED_LIMIT, RIGHT_OF_WAY_REGULATION, SLOPE_ARRAY, and TOURIST_ROUTE_TYPE. However, the customized geographic database 770 will not include the LANE_MASK single attribute 740. In an embodiment, the customized geographic database 770 is created by the adaptation compiler 700 when a designated action area 760 is selected.

Figure 8:
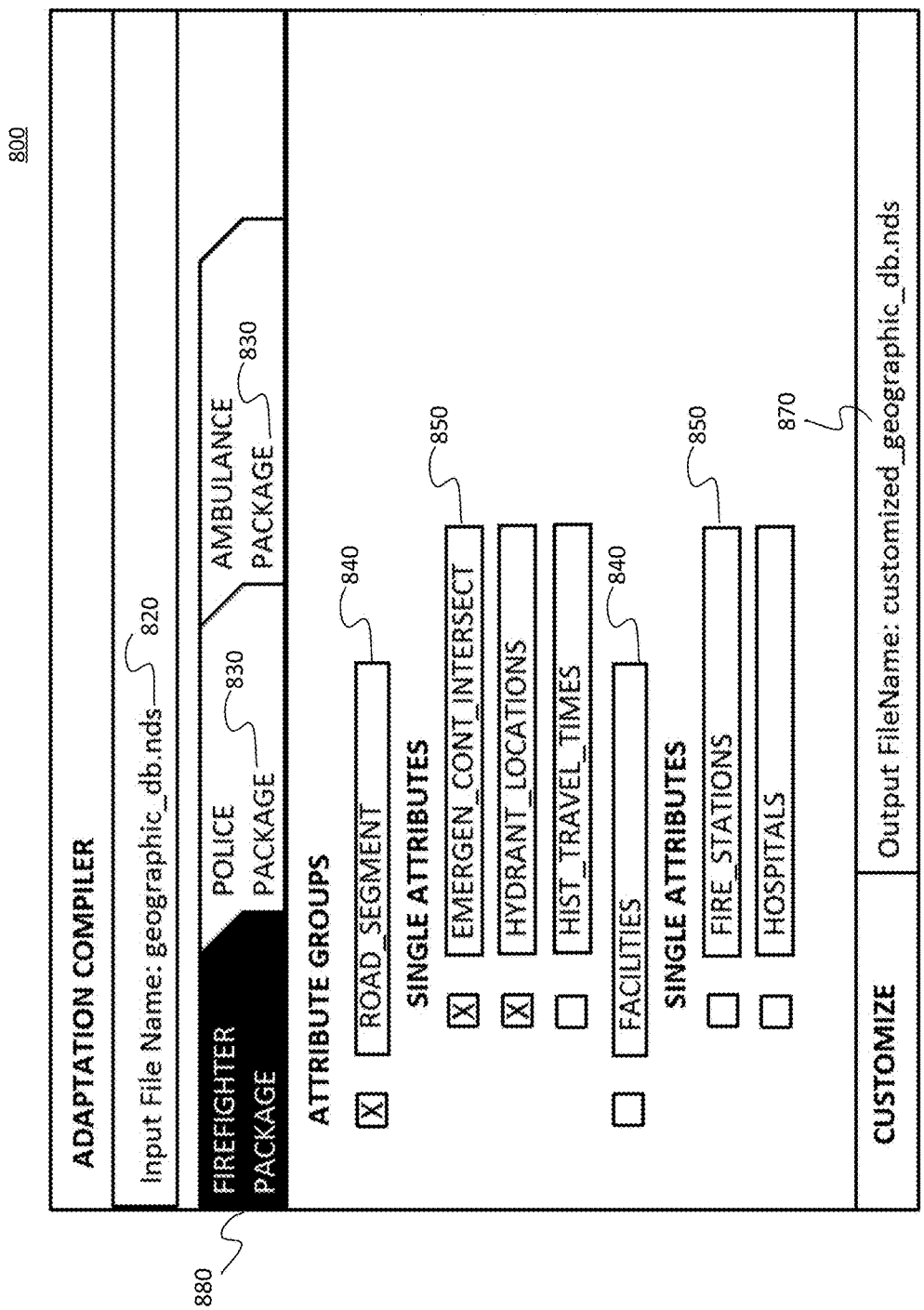
FIG. 8 depicts another exemplary interface with a database customization system.

FIG. 8 depicts another exemplary interface with a database customization system. The interface may be a Graphical User Interface (GUI) used with an adaptation compiler 800. The adaptation compiler 800 contains packages 830 or templates of categorized database structure elements, all of which exist in the geographic database 820. In this embodiment, the database structure elements involve attribute packages 830, attribute groups 840, and single attributes 850. The packages 830 may include selections of attributes to include in a customized geographic database 870, based on the customized geographic database's intended purpose. For example, the current active tab 880 in the GUI interface indicates that there is a firefighter package of attributes. The firefighter attributes include specific attribute groups 840 and single attributes 850 that may be useful in a firefighter customized database.

In an embodiment, the single attribute 850 emergency controlled intersections may identify the locations of the street intersections that can be controlled by emergency vehicles. This attribute may be beneficial for a driver of a fire truck. Further, to save disk space, or to increase database efficiency, the single attribute 850 of historical travel times for particular road segments may not be considered as valuable as intersection data. Also, entire attribute groups 840 may be unselected for inclusion in a customized geographic database. For example, a facilities attribute group may not be deemed necessary for a firefighter customized database, and as such all of the single attributes 850 included in the facilities attribute group may be unselected. Therefore entire modules of attributes may be included or excluded based on selection.

Packages may include templates of standard attribute groups and sets to include or exclude for different intended customized geographic database uses. For example, an adaptation compiler 800 may include a police package of attributes and an ambulance package of attributes as well as a firefighter package of attributes. The adaptation compiler may also have pre-selected attributes to include in a customized geographic database 870 in each package. In this way, an organization, such as a municipality, may be provided a general geographic database 820 along with an adaptation compiler 800, and thereafter the organization may generate multiple customized geographic databases 870 for specific uses in the organization. The organization may also modify the package 830 attribute selections to fine tune the functionality and efficiency of the customized geographic databases 870.

While the computer-readable medium may be shown in figures to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method implemented by a navigation system, the method comprising:

analyzing, with a processor of the navigation system, a geographic database to determine database structure elements, wherein the database structure elements comprise road attributes or points of interest, wherein analyzing the geographic database comprises determining a hierarchy of database structure elements with the database structure elements arranged in groups within the hierarchy, and wherein determining the hierarchy comprises grouping database features into database attributes and grouping database attributes into larger database building blocks;

determining a selection of one or more first database structure elements that relate to a first set of drivers to include in a first customized compiled geographic database wherein at least one database structure element is omitted from the first customized compiled geographic database, wherein determining the selection of one or more first database structure elements comprises determining a selection of a greater hierarchical grouping including one or more subordinate database structure elements so as to thereby select each of the one or more subordinate database structure elements;

determining a selection of one or more second database structure elements that relate to a second set of drivers to include in a second customized compiled geographic database wherein at least one database structure element is omitted from the second customized compiled geographic database;

extracting the selected first database structure elements including the one or more database structure elements included in the hierarchical grouping that has been selected from the geographic database;

compiling with the processor, the first customized geographic database for the first set of drivers using the extracted first database structure elements;
extracting the selected second database structure elements from the geographic database; and
compiling with the processor, the second customized geographic database for the second set of drivers using the extracted second database structure elements, wherein the compiled second customized geographic database is distinct from the compiled first customized geographic database,
wherein the first and second customized geographic databases include geographic data used by the first and second sets of drivers, respectively, for a navigation-related application.

2. The method of claim 1, wherein the geographic database comprises a compiled navigation database standard (NDS) or a map positioning engine (MPE) database.

3. The method of claim 1, wherein the analyzing comprises:
analyzing metadata of the geographic database.

4. The method of claim 1, wherein the analyzing comprises:
analyzing the geographic database using a reflection technique.

5. The method of claim 1, wherein the database structure elements comprise database attributes or database attribute combinations.

6. The method of claim 1, further comprising:
presenting database structure elements to a user using a graphical user interface (GUI), and wherein the selecting is performed using the GUI.

7. The method of claim 1, wherein the compiling of the first customized geographic database and second customized geographic database further comprises compiling data of the first and second customized geographic databases in the form of a useable navigation database standard (NDS) or map positioning engine (MPE) database.

8. The method of claim 1, wherein the determining the selection of one or more database structure elements to include in the first customized geographic database comprises modifying attribute selections of an attribute package tailored for a specific use.

9. A navigation system comprising:
a memory configured to store a geographic database, a compiled geographic database, a first customized database and a second customized geographic database;
a generic compiler configured to compile a geographic database without system specific settings;
an adaptation compiler configured to analyze the compiled geographic database to determine database structure elements, wherein the database structure elements comprise road attributes or points of interest, wherein the adaption compiler is further configured to analyze the geographic database by determining a hierarchy of database structure elements with the database structure elements arranged in groups within the hierarchy, and wherein the adaption compiler is further configured to determine the hierarchy by grouping database features into database attributes and grouping database attributes into larger database building blocks;
a display operable to present database structure elements to a user; and
an input device operable to allow the selection of at least one first database structure element to include in the first customized geographic database including selection of a greater hierarchical grouping including one or more subordinate database structure elements so as to thereby select each of the one or more subordinate database structure elements, the input device operable to allow the selection of at least one secondary database structure element to include in the second customized geographic database, wherein the at least first database structure element relates to a first set of drivers, wherein the at least second database structure element relates to a second set of drivers;
wherein the adaptation compiler is further configured to extract at least one first selected database structure element including the one or more database structure elements included in the hierarchical grouping that has been selected, and compile the first customized geographic database comprising the at least one first selected extracted database structure element, wherein the processor is further configured to extract at least one second selected database structure element, and compile the second customized geographic database comprising the at least one second selected extracted database structure element;
wherein the first and second customized geographic databases include geographic data used for a navigation-related application with the first customized geographic database being for the first set of drivers and the second customized geographic database being for the second set of drivers; wherein the first customized geographic database is distinct from the second customized geographic database.

10. The navigation system of claim 9, wherein the compiled geographic database comprises a compiled navigation database standard (NDS) or a map positioning engine (MPE) database.

11. The navigation system of claim 9, wherein the adaptation compiler is further configured to analyze the compiled geographic database using a reflection technique.

12. The navigation system of claim 9, wherein the adaption compiler is further configured to:
identify one or more binary large object (BLOB) structures of the geographic database,
inspect the one or binary large object (BLOB) structures to identify the database structure elements, and
store the database structure elements in a relational database.

13. A non-transitory computer readable medium including instructions that when executed are operable to cause a processor of a navigation system to:
compile a geographic database using settings without any system specific settings;
analyze the compiled geographic database to determine database structure elements, wherein the database structure elements comprise road attributes or points of interest, wherein the geographic database is analyzed by determining a hierarchy of database structure elements with the database structure elements arranged in groups within the hierarchy, and the hierarchy is determined by grouping database features into database attributes and grouping database attributes into larger database building blocks;
determine a selection of one or more first database structure elements that relate to a first set of drivers to include in a first customized geographic database wherein at least one database structure element is omitted from the first customized geographic database, wherein the selection of one or more first database structure elements is determined by determine a selection of a greater hierarchical grouping including one or more subordinate database structure elements so as to thereby select each of the one or more subordinate database structure elements;

determine a selection of one or more second database structure elements that relate to a second set of drivers to include in a second customized geographic database wherein at least one database structure element is omitted from the second customized geographic database;

extract the selected first database structure elements from the complied geographic database including the one or more database structure elements included in the hierarchical grouping that has been selected;

extract the selected second database structure elements from the compiled geographic database;

compile the first customized geographic database for the first set of drivers from the geographic database comprising the extracted first database structure elements; and compile the second customized geographic database for the second set of drivers from the geographic database comprising the extracted second database structure elements, wherein the first and second customized geographic databases include geographic data used by the first and second sets of drivers, respectively, for a navigation-related application.

14. The medium of claim 13, wherein the compiled geographic database comprises a compiled navigation database standard (NDS) or a map positioning engine (MPE) database.

15. The method of claim 1, wherein analyzing comprises:
identifying one or more binary large object (BLOB) structures of the geographic database,
inspecting the one or binary large object (BLOB) structures the database structure elements, and
storing the database structure elements in a relational database.

16. The method of claim 15, further comprising aggregating at least some of the database structure elements stored in the relational database.

17. The method of claim 1, wherein analyzing comprises:
monitoring the execution of the geographic database,
determining a structure of the geographic database, and
generating the database structure elements from the structure of the geographic database.

18. The method of claim 1, wherein the first set of drivers includes delivery drivers and the second set of drivers includes emergency drivers.

19. The method of claim 1, wherein the first set of drivers includes ambulance drivers and the second set of drivers includes firefighter drivers.

* * * * *